Feb. 3, 1970  E. V. GUALANO  3,493,203
AUTOMOTIVE RAIN GUTTER CARRIER ATTACHMENT
Filed Oct. 19, 1965  3 Sheets-Sheet 1
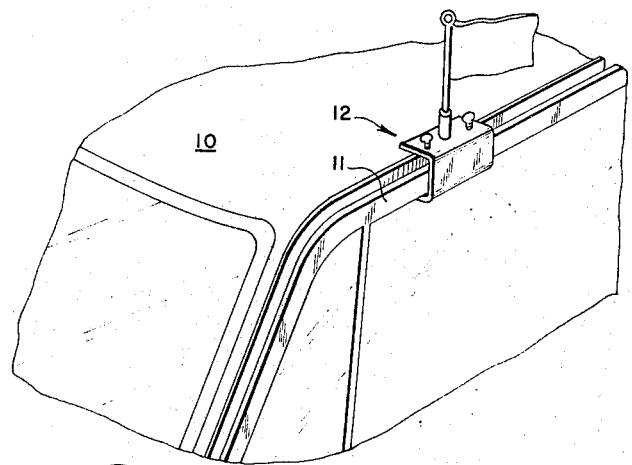
FIG. 1
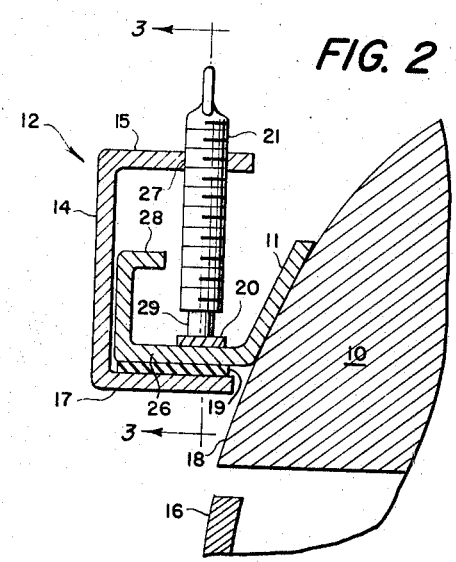
FIG. 2
FIG. 2A
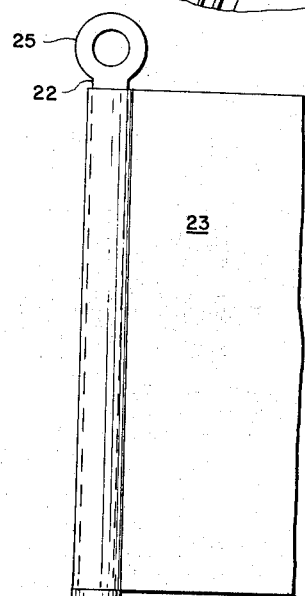
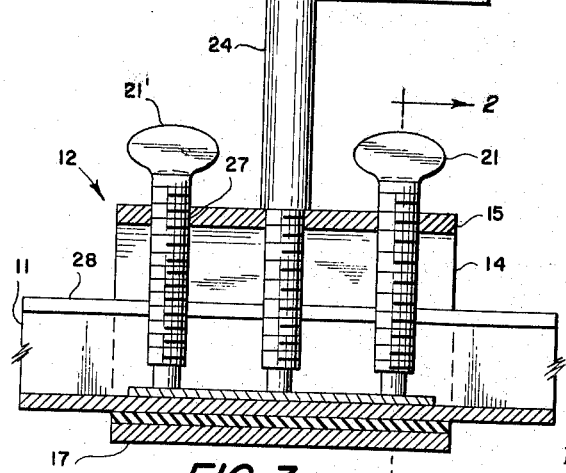
FIG. 3
INVENTOR
EMIL V. GUALANO
BY *Larson and Taylor*
ATTORNEYS

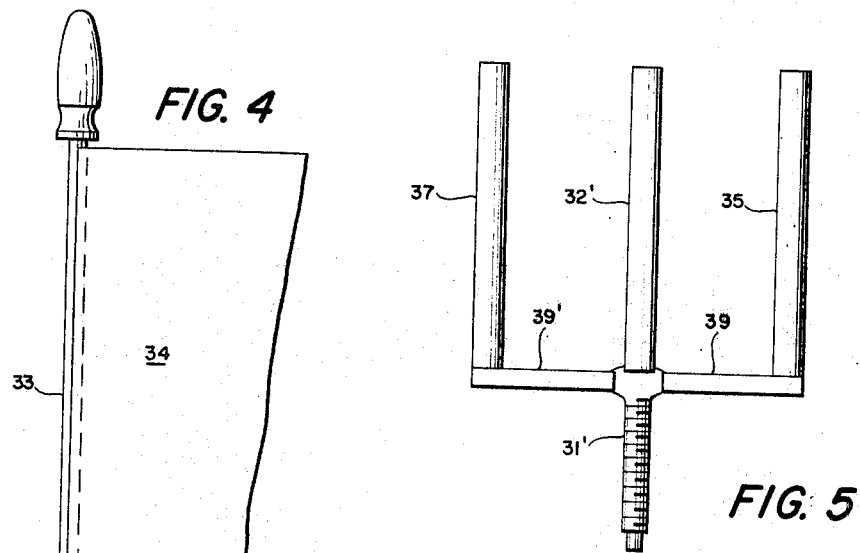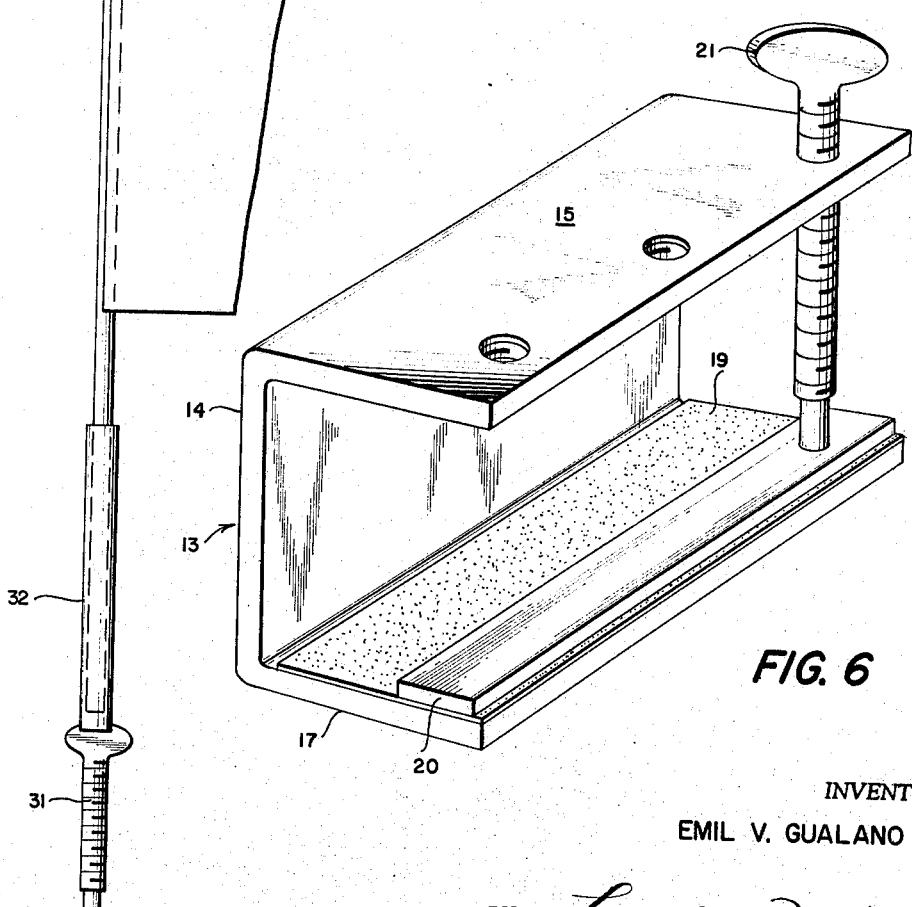

Feb. 3, 1970 — E. V. GUALANO — 3,493,203

AUTOMOTIVE RAIN GUTTER CARRIER ATTACHMENT

Filed Oct. 19, 1965 — 3 Sheets-Sheet 3

INVENTOR
EMIL V. GUALANO
BY Larson and Taylor
ATTORNEYS

United States Patent Office 3,493,203
Patented Feb. 3, 1970

3,493,203
AUTOMOTIVE RAIN GUTTER CARRIER
ATTACHMENT
Emil V. Gualano, 107 N. Hillview Ave.,
Los Angeles, Calif. 90022
Filed Oct. 19, 1965, Ser. No. 498,062
Int. Cl. B60r 9/04, 13/04
U.S. Cl. 248—43                                    1 Claim

ABSTRACT OF THE DISCLOSURE

A clamping element for attachment to the peripheral rain gutter of an automobile. The element includes a U-shaped member having upper and lower legs interconnected by a channel portion and extending above and below the rain gutter respectively. A bolt passes through a bolt hole in the upper leg to hold the clamping element onto the gutter. The dimensions of the clamping element are so chosen that the element will fit onto the rain gutter of virtually every make and model of automobile since the model year 1949. Functional elements such as flagstaffs and the like may be attached directly to the threaded bolts.

---

This invention relates to an automobile roof-top carrier assembly. More particularly it relates to a simplified universal carrier assembly which is mountable on the peripheral rain gutter of all automobiles.

Carrier assemblies mountable on the rain gutter of automobiles are known in the art. However previous carrier assemblies have had many inherent disadvantages which have made them unacceptable in practice.

First, most previous assemblies have been designed for a rain gutter of a particular shape. Attempts to provide a universal rain gutter carrier assembly having a clamp adaptable to all automobiles have not been successful. Variations in the shape of rain gutters on different makes of cars have thus far proved an insurmountable obstacle to the design of an acceptable universal rain gutter carrier assembly. For instance in some cars the roof line immediately below the rain gutter extends outwardly in a manner that would interfere with many carrier assembly clamps. In other automobiles the top of the door comes so close to the bottom of the rain gutter that a carrier assembly clamp would obstruct the normal operation of the door. In order to overcome this difficulty previous carrier assembly clamps have been manufactured in a plurality of sizes and shapes to fit specific cars. Such a procedure requires manufacturing the assemblies in smaller lots and thereby incerases the cost of the individual assembly.

Alternative measures for providing an acceptable universal carrier assembly clamp have also proved unacceptable. Some previous assemblies have employed springs or other non-rigid means for attaching the clamp to the rain gutter. These are unsuitable, first, because they are relatively expensive; and second, because they do not provide the rigid attachment necessary to hold the assembly securely to the rain gutter as the car is subjected to bumps in the road during normal driving. Other universal carrier assemblies have employed an adjustable feature; for instance two clamp members movable towards each other whereby the distance between the two is controlled by an adjustable screw. These adjustable carrier assemblies, like the non-rigid universal assemblies, have proved unsatisfactory since they lack the rigid attachment necessary to hold the assembly on the rain gutter as the car goes over bumps in the road and thereby subjects the carrier assembly to vertical removing forces.

A second major disadvantage of the previous clamps has been their inflexibility. In most assemblies, to remove a functional element, such as a load carrying hook or a pennant mounting attachment, it was necessary to remove the entire carrier assembly including the clamp. Alternatively, some assemblies did allow removal of the functional element alone, leaving the clamp portion of the carrier assembly on the car. However in these assemblies it is not also possible to remove the whole assembly in a single step. Further, in most carrier assemblies the clamps may be used with only one functional element. In none of the previous assemblies was a single clamp adapted to interchangably receive various functional elements such as load carrying hooks, pennant mounting clamps, etc. This, "single use" disadvantage is brought about by the fact that in most previous carrier assemblies the functional element has been affixed to the clamp itself so that the clamp and the functional element were, in essence, one operational element.

According to the present invention a simplified, economical and flexible universal rain gutter carrier assembly has been provided which, in a single construction combines the features and overcomes the disadvantages of the previous carrier assemblies.

Although carrier assemblies having U-shaped clamps have been employed in the past, I have found that by constructing the U-shaped clamp according to specific dimensions I could provide a clamp which would fit all makes of cars. My U-shaped clamp is provided with a central channel portion interconnecting an upper leg and a lower leg parallel to the upper leg. The length of the clamp along the rain gutter is not critical. The width of the upper leg is approximately $10/16$ of an inch and the lower leg approximately $9/16$. On some automobiles the lip of the rain gutter curves back toward the automobile to such an extent that it is necessary to provide a wide upper leg. However on some other automobiles, the roof line immediately below the rain gutter extends outwardly so that only a narrow lower leg would not be obstructed by the roof line. However the extent to which the width of the upper leg can be increased or the width of the lower leg decreased is limited by the fact that the portion of the upper leg through which the holding screws pass must be vertically aligned with a portion of the lower leg. By making the width of the upper leg approximately $10/16''$ and the width of the bottom leg approximately $9/16''$ I have provided a clamp in which the upper leg is sufficiently wide and the lower leg sufficiently of a narrow width so that the clamp will fit onto the rain gutter of all automobiles.

The threaded holes in the upper leg for the screws which hold the U-shaped clamp to the rain gutter should be as far from the channel portion of the clamp as possible so that they will pass over the wide lip of some rain gutters, but must be spaced inwardly from the edge of the upper leg a sufficient amount so that (1) the threaded holes do not weaken the strength of the upper leg and (2) the holding screws move on a path which intersects the lower leg of the clamp. With upper and lower legs of the widths discussed above I have found that the threaded holes in the upper leg should be spaced with their centers approximately $3/16''$ from the edge of the upper legs to obtain optimum results.

Further, while it would be desirable to provide as thick a material as possible I have found that if the clamp is too thick the lower leg will obstruct movement of the door on some automobiles where the top of the door is located immediately below the rain gutter. I have found that a thickness of 0.125", or twelve gauge would provide sufficient strength so the clamp would be held onto the rain gutter and at the same time would not obstruct the movement of the door on any automobile.

Having provided a simpified universal carrier assembly I have also found a simplified and flexible method for attaching the functional element to the clamp. At least one, and more often a plurality of threaded holes, are provided in the upper leg of the clamp. The U-shaped clamp is placed onto the automobile rain gutter so that the upper leg extends above the lip of the gutter and the lower leg below the gutter. A felt surface is provided on the lower leg to protect the bottom surface of the rain gutter. A threaded wing bolt is then passed through the threaded holes in the upper leg of the clamp element and are screwed downwardly until they engage the bottom of the rain gutter to hold the clamp rigidly to the rain gutter. Since the inside of the rain gutter on most automobiles often becomes clogged with putty or dirt it has been found desirable to place a shim inside of the rain gutter and to screw the bolt down to the shim rather than to the lower inside surface of the rain gutter. Further, it has been found that screwing the bolt tightly has caused the threads at the end of the bolt to become distorted or bent. Accordingly it has been found desirable to provide blank threads at the ends of the bolt.

The functional element is then mounted on one of the wing bolts rather than on the clamp itself. For instance, in one embodiment of the invention a pennant holding socket is rigidly attached to the wing at the upper end of the wing bolt. In another embodiment, where it is desirable to mount a flag so that it rotates freely about the staff, the staff itself may be provided with threads at its lower end so that the lower end of the staff is the bolt which holds the clamp onto the gutter. To enhance the free rotation of the flag a sleeve may be loosely mounted on the staff above the upper leg and the portion of the pennant surrounding the staff may rest on the upper end of the sleeve.

Further it should be clear that any other type of functional element, such as a hook for supporting elongated articles such as fishing poles, a bracket for mounting a sign, or a plurality of large rods on which heavy duty supporting braces may be mounted, or many others may be attached to a threaded wing bolt or have threads at their lower ends for engagement with the threaded holes in the clamp.

Since the functional elements are connected directly to (or are formed on) the threaded bolt which holds the clamp to the rain gutter, it is possible to remove the functional element and the clamp element in one operation. Alternatively, if it is desired to leave the clamp on the automobile and remove only the functional element, then a separate wing bolt may be inserted in one of the thread holes other than that of the functional element so that after removal of the functional element, the other bolt will still hold the clamp firmly to the rain gutter.

Thus I have provided a carrier assembly for attaching various functional elements to the rain gutter of an automobile in which a single carrier assembly construction can find unlimited use. First it is universal and thereby applicable to all automobiles. Secondly it is very flexible in its use and may thereby be employed by all persons wishing to mount any functional element on the rain gutter of their automobile, irregardless of the nature of the intended use. It should be noted also that mounting of the clamp and the function elements may be accomplished by hand without the use of tools.

Accordingly it is an object of this invention to provide a universal automobile rain gutter carrier assembly which will fit all automobiles but is extremely simplified and economical in its construction.

It is another object of this invention to provide a carrier assembly for the rain gutters of automobiles which is flixible and which is adaptable for many intended uses.

It is still another object of this invention to provide a simplified pennant mounting assembly for the rain gutter of an autombile.

It is still another object of this invention to provide a carrier assembly for the rain gutter of an automobile which will allow either the functional element or the clamp plus the functional element to be removed from the automobile in a single operation.

Other objects and advantages of the invention will be apparent during the following given with relation to the accompanying drawings of which:

FIG. 1 is a perspective view of a carrier assembly of the present invention in use on an automobile.

FIG. 2 is a sectional view of the invention mounted on an automobile rain gutter.

FIG. 2a is similar to FIG. 2 but shows the invention mounted on a rain gutter having a different shape than that shown in FIG. 2.

FIG. 3 is a sectional view taken on line 3—3 of FIG. 2.

FIGS. 4 and 5 show bolts with flag mounting attachments which may be employed in place of the flag mounting attachment shown in FIG. 3.

FIG. 6 is a perspective view of a U-shaped clamp element forming a part of the invention.

Figure 7:
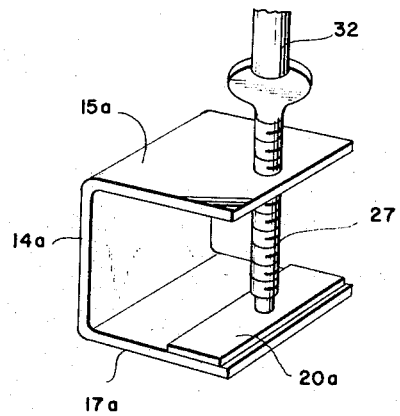
FIG. 7 is a perspective view of another U-shaped clamp element.

Referring to FIG. 1 the carrier assembly 12 is mounted on the rain gutter 11 of an automobile 10. The U-shaped clamp extends along the rain gutter 11 and the functional elements of the mounting bolts extend vertically through the top leg of the clamping element.

Referring to FIG. 2 the cross section of a rain gutter 11 is shown attached to the side of an automobile 10 is portion of which is shown. In the type of rain gutter construction in FIG. 2 a portion of the side of the automobile 18 extends below the bottom level of the rain gutter 26 and outwardly away from the center of the automobile 10. At the outer portion of the rain gutter 11 lip 28 extends inwardly. The carrier assembly 12 is positioned on the rain gutter 11 so that the upper leg 15 extends above the rain gutter and past the lip 28 and a lower leg 17 extends below the rain gutter. A felt pad 19 is provided to prevent the lower leg from scratching the bottom 26 of the rain gutter 11. A wing bolt 21 is then engaged in a threaded hole 27 provided in the upper leg 15 of the clamping element and screwed downwardly to the bottom of the gutter. However, since dirt or putty may accumulate in the rain gutter, a shim 20 is placed in the rain gutter and the screw 21 passing through the hole 27 is tightened against the shim 20. The shim 20 may be left in the rain gutter when the carrier assembly is removed. It may be provided of magnetic material so that it will remain in position in the gutter between uses of the clamping element.

Referring to FIG. 2 the clamping element 14 must be specifically designed so that a sufficient portion of the upper leg 15 extends past the lip 28 of the rain gutter and so that the lower leg 17 is not obstructed by the portion of the car 18 below the rain gutter. FIG. 2 shows only one automotive rain gutter construction. However in other constructions the outwardly extending portion 18, of the automobile roof or the width of the lip 28 may vary. It has been found however that by carefully choosing the widths of the upper and lower legs 15 and 17 of the clamping element, as discussed above, that a clamping element may be designed which will fit all automobiles.

FIG. 2a shows the same clamping element as shown in FIG. 2 applied to a different type of automobile rain gutter construction. In this type of construction no portion of the side of the car extends downwardly below the rain gutter like the portion 18 in FIG. 2. However, here, the upper edge of the door 16' comes very close to the bottom of the rain gutter 11. Accordingly the thickness of the lower leg of the clamping element 14 must be kept thin enough so that it may fit above the upper door edge in all automobiles having this rain gutter construction. The leg cannot be made too thin, however, or it will not have the strength necessary to rigidly hold the clamp to the rain gutter at all times. By carefully controlling the thickness of the element 14 as discussed above, a clamping element may be provided which provides sufficient strength and at the same time fits all automobiles having the rain gutter construction shown in FIG. 2a.

It has been found that if the screws 21 are forced against the shim 20 the bottom most threads on the screw 21 may become distorted. To prevent this, the lower portion of the bolts 21 are provided with blank threads.

FIG. 3 shows the carrier assembly 12 in use with one typical functional element. In this instance it is desired to mount on the clamping assembly a pennant which will rotate freely about its staff. An elongated bolt 22 extends from the rounded portion 25 at the top down to a threaded portion at the bottom. The bolt 22 not only serves as a staff for the pennant 23 but also serves as a means for holding the clamp 14 to the automobile rain gutter. A loosely mounted sleeve 24 is positioned on the flagstaff bolt 22 above the upper leg 15. A rigid pennant 23, or at least a pennant having a rigid portion surrounding the flagstaff bolt 22, rests on the upper edge of sleeve 24. Thus as the pennant 23 rotates about staff 22, because of wind or automobile motion, the sleeve 24 acts as a bearing between the upper leg 15 and the pennant 23 to allow free rotation of the pennant 23 about staff 22.

In FIG. 3 the flag mounting means is shown in cooperation with two additional screws 21 and 21'. These screws may be omitted or only one may be used. The number of screws will depend upon the intended use of the functional attachment. For example if one wishes to mount the clamping element 14 on the car at all times but remove the pennant 23 periodically then at least one screw in addition to the flagstaff screw 22 should be employed. If on the other hand it is desired to remove both the flagstaff and the clamp 14 together then each of the screws 21 and 21' may be omitted. In this instance a narrow clamp having only a single threaded hole as shown in FIG. 7 may be employed instead of the three hole clamp.

Further, the number of functional elements which may be employed in the present invention is limitless. For instance referring to FIG. 3 one may wish to remove the screw 21' and employ a second functional attachment such as a second flag or a hook for holding an article etc.

FIG. 4 and 5 show additional pennant mounting means which may be employed in place of or in addition to the flagstaff bolt 22 shown in FIG. 3. In FIG. 4 a screw 31 has attached thereto a socket 32 in which may be mounted a flagstaff 33 having a pennant or flag 34 rigidly attached thereto.

Alternatively, as shown in FIG. 5, a bolt 31' may have a plurality of sockets similar to socket 32 attached to the wing of the wing bolt 31'. In FIG. 5 three flag mounting sockets 32', 35 and 37, the latter two connected to the bolt 31 by cross members 39 and 39' may be employed in place of the single socket element shown in FIG. 4.

FIG. 6 shows a perspective view of the clamping element 13 showing also a felt surface 19, a shim 20 and a threaded bolt 21.

While certain dimensions of the clamp are carefully controlled, the length of the U-shaped clamp along the longitudinal axis of the rain gutter may be varied depending on the particular use to which the carrier assembly is to be put. For example FIG. 7 shows a short clamp having a single threaded hole which would be ideal for mounting a pennant where it will always be desired to remove the whole carrier assembly whenever the flag is removed. In FIG. 7 clamp portions 14a, 15a, and 17a and shim 20a are similar to 14, 15, 17 and 20 in FIGS. 1–6 except that they are shorter in length.

Figure 8:
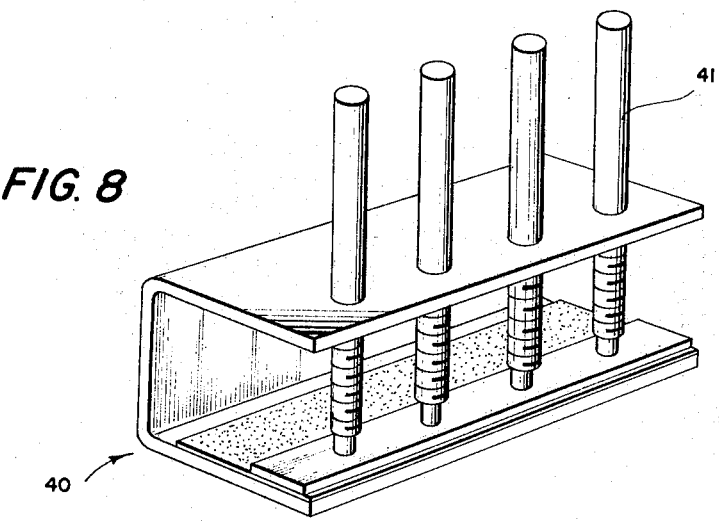
FIG. 8 is a perspective view of another embodiment of the invention.
Figure 9:
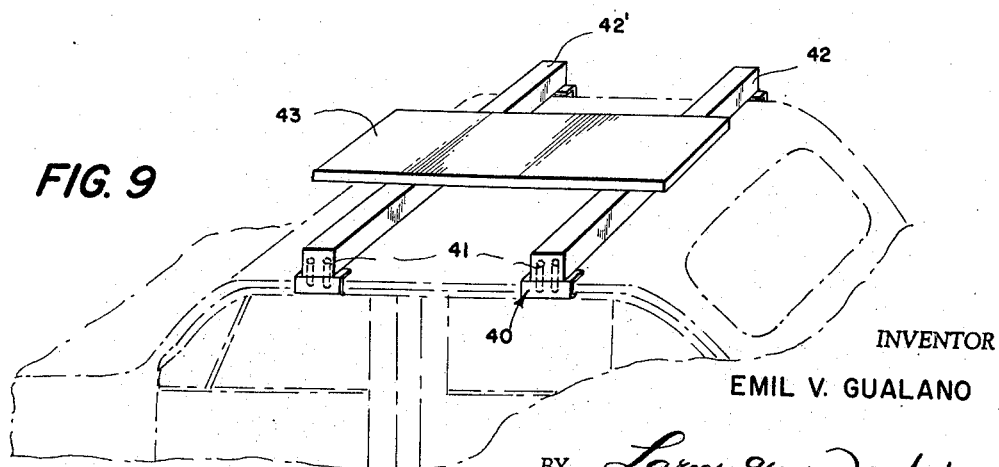
FIG. 9 shows the embodiment of FIG. 8 in use on an automobile.

FIGS. 8 and 9 illustrates an embodiment of the invention designed for carrying very heavy loads on the car. In this embodiment the clamp 40 is identical in all respects to the clamp 13 except that it is longer, having room for four threaded holes instead of three. Rods 41, having threaded holes at their lower ends for attaching the clamp to the rain gutter, are shaped at their upper ends to be received in holes in a beam 42 and thereby hold the beam 42 onto the car. A second carrier assembly 40 is placed on the other rain gutter directly across the car from the first clamp 40 to support the other side of the beam 42. A second beam 42' is placed across the roof in the same manner as beam 42 so that beams 42 and 42' support heavy load 43.

The load carrying assembly shown in FIGS. 8 and 9 has all of the previously discussed advantages of the present invention. Further, it has the added advantage that no portion of the load carrying assembly touches the roof of the car.

Although the invention has been described in considerable detail in reference to certain preferred embodiments thereof, it will be understood that variations and modifications can be effected without departing from the scope and spirit of the invention.

I claim:

1. A carrier assembly for attachment to the peripheral rain gutter of an automobile comprising a U-shaped clamp member comprising an upper leg and a lower leg interconnected by a channel portion, each leg extending substantially perpendicularly from the channel portion towards the automobile, said upper leg adapted to extend above the rain gutter, said upper leg having at least one threaded hole formed therein, and the lower leg adapted to extend below the rain gutter, and connecting means for rigidly attaching the said clamp member to the rain gutter, said connecting means including a threaded bolt which engages the threaded hole for attaching the clamp member to the rain gutter, said carrier assembly further including a pennant staff rigidly attached to said threaded bolt of the connecting means, and including a sleeve member having an upper and a lower end and loosely surrounding the said staff, said sleeve lower end resting on the top of the said upper leg when the threaded bolt is engaged in the said threaded hole and a pennant loosely mounted on the said staff and resting on the upper end of the sleeve member, said sleeve and said pennant both being rotatable about said staff.

References Cited

UNITED STATES PATENTS

| 1,857,774 | 5/1932 | Wickman | 248—39 |
| 2,552,879 | 5/1951 | Woerner. | |
| 3,178,139 | 4/1965 | McFarlin | 248—43 |

FOREIGN PATENTS

| 31,712 | 11/1961 | Finland. |
| 976,846 | 11/1950 | France. |
| 1,241,253 | 8/1960 | France. |

ROY D. FRAZIER, Primary Examiner

J. FRANKLIN FOSS, Assistant Examiner

U.S. Cl. X.R.

224—42.1